United States Patent
Kano et al.

(10) Patent No.: US 11,456,654 B2
(45) Date of Patent: Sep. 27, 2022

(54) TUBULAR LINEAR MOTOR

(71) Applicant: KYB CORPORATION, Tokyo (JP)

(72) Inventors: Yoshiaki Kano, Aichi (JP); Kousuke Satou, Tokyo (JP); Shinichirou Hakamada, Tokyo (JP); Daichi Shibahara, Tokyo (JP)

(73) Assignee: KYB CORPORATION, Tokyo (JP)

( * ) Notice: Subject to any disclaimer, the term of this patent is extended or adjusted under 35 U.S.C. 154(b) by 309 days.

(21) Appl. No.: 16/620,972

(22) PCT Filed: Oct. 22, 2018

(86) PCT No.: PCT/JP2018/039159
§ 371 (c)(1),
(2) Date: Dec. 10, 2019

(87) PCT Pub. No.: WO2019/102761
PCT Pub. Date: May 31, 2019

(65) Prior Publication Data
US 2020/0212787 A1    Jul. 2, 2020

(30) Foreign Application Priority Data

Nov. 24, 2017 (JP) ............................. JP2017-225405
Oct. 19, 2018 (JP) ............................. JP2018-197259

(51) Int. Cl.
*H02K 41/03* (2006.01)

(52) U.S. Cl.
CPC .................................. *H02K 41/031* (2013.01)

(58) Field of Classification Search
CPC ......................... H02K 41/031; H02K 2213/03
USPC ............................................... 310/12.18
See application file for complete search history.

(56) References Cited

U.S. PATENT DOCUMENTS

| 7,839,030 | B2 | 11/2010 | Tang et al. |
| 2008/0218005 | A1 | 9/2008 | Tang et al. |
| 2009/0302692 | A1 | 12/2009 | Tang et al. |
| 2016/0359402 | A1* | 12/2016 | Makino et al. ...... H02K 41/031 |

FOREIGN PATENT DOCUMENTS

| JP | 2008-253130 A | 10/2008 | |
| JP | 2001 199936 A | * 3/2010 | ........... H02K 41/031 |
| JP | 2011-199936 A | 10/2011 | |

(Continued)

OTHER PUBLICATIONS

Feb. 1, 2021, European Search Report issued for related EP application No. 18881194.7.

*Primary Examiner* — Mang Tin Bik Lian
*Assistant Examiner* — Henry K Cho
(74) *Attorney, Agent, or Firm* — Paratus Law Group, PLLC (57) ABSTRACT

To achieve the foregoing object, a tubular linear motor of the present invention includes a core that has a tubular yoke and a plurality of teeth which are annular and provided at intervals in an axial direction on an outer periphery of the yoke; a winding mounted in a slot between the teeth; and a field magnet that is tubular, into which the core is movably inserted in the axial direction, and having N poles and S poles alternately arranged in the axial direction. An axial width Wi of a yoke-side inner peripheral edge of the teeth is larger than an axial width of an outer peripheral edge of the teeth.

5 Claims, 10 Drawing Sheets

(56) References Cited

FOREIGN PATENT DOCUMENTS

| JP | 2013-021787 A | 1/2013 |
|---|---|---|
| JP | 2017-093072 A | 5/2017 |
| WO | WO 2014/020695 A1 | 2/2014 |

\* cited by examiner

TUBULAR LINEAR MOTOR

CROSS REFERENCE TO PRIOR APPLICATION

This application is a National Stage Patent Application of PCT International Patent Application No. PCT/JP2018/039159 (filed on Oct. 22, 2018) under 35 U.S.C. § 371, which claims priority to Japanese Patent Application Nos. 2017-225405 (filed on Nov. 24, 2017) and 2018-197259 (filed on Oct. 19, 2018), which are all hereby incorporated by reference in their entirety.

TECHNICAL FIELD

The present invention relates to a tubular linear motor.

BACKGROUND ART

As disclosed in JP 2008-253130 A, for example, a tubular linear motor may include an armature provided with a core having a tubular yoke and a plurality of teeth arranged side-by-side in an axial direction on an outer periphery of the yoke, and with U-phase, V-phase, and W-phase windings which are mounted in slots between the teeth; and a movable element configured from a cylindrical base provided at an outer periphery of the armature and from a plurality of permanent magnets attached to an inner periphery of the base such that S poles and N poles are alternately arranged side-by-side in an axial direction (see Patent Literature 1, for example).

In the tubular linear motor thus configured, when the U-phase, V-phase, and W-phase windings of the armature are suitably electrified, the permanent magnets of the movable element are attracted, and the movable element is driven in an axial direction toward the armature.

SUMMARY OF INVENTION

Figure 10:
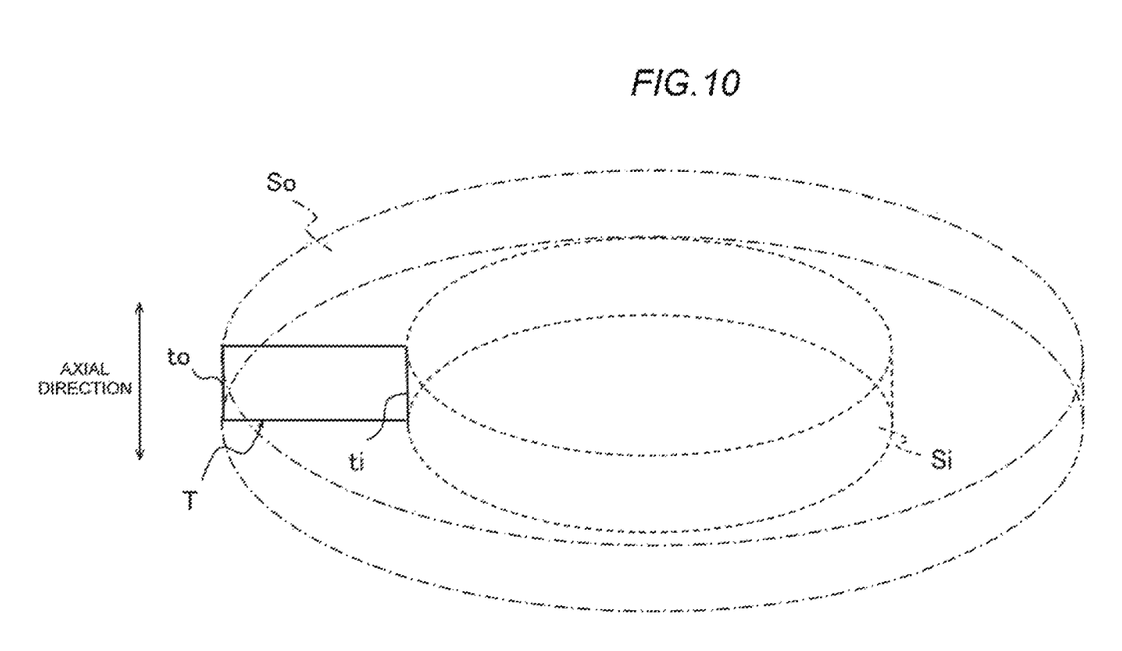
FIG. 10 is a diagram illustrating the areas of the inner peripheral edge and outer peripheral edge of the teeth of a conventional tubular linear motor.

In the armature of the tubular linear motor, teeth are provided on the outer periphery of the yoke, and the axial width of the teeth is equal, from the inner periphery to the outer periphery thereof. Furthermore, because the core has a cylindrical shape, if a cross section obtained by cutting the teeth T using a cylinder centered on the axis of the core is considered, the cross-sectional area of the teeth T has a minimum area Si at the inner peripheral edge ti (a surface obtained by cutting, at the outer periphery of the yoke, the boundary between the teeth and the yoke) of the teeth T, as illustrated in FIG. 10. Because the axial width of the teeth T is constant, the cross-sectional area thereof is proportional to the size of the diameter and hence has a maximum area So at an outer peripheral edge to, a gradually decreasing area in moving from the outer peripheral edge to the inner peripheral side, and the minimum area Si at the inner peripheral edge ti.

Thus, the magnetic circuit cross-sectional area of the teeth T is also maximum at the outer peripheral edge to of the teeth T and minimum at the inner peripheral edge ti of the teeth T. In a conventional tubular linear motor of this kind, even when the winding is electrified, because the magnetic circuit cross-sectional area at the inner peripheral edge ti of the teeth T is small, the magnetic flux is saturated at the inner peripheral edge ti, which has made obtaining a large thrust difficult.

Thus, an object of the present invention is to provide a tubular linear motor capable of suppressing magnetic saturation to improve thrust.

To achieve the foregoing object, a tubular linear motor of the present invention includes a core that has a tubular yoke and a plurality of teeth which are annular and provided at intervals in an axial direction on an outer periphery of the yoke; a winding mounted in a slot between the teeth; and a field magnet that is tubular, into which the core is inserted movably in the axial direction, and having N poles and S poles alternately arranged in the axial direction, wherein an axial width of a yoke-side inner peripheral edge of the teeth is larger than an axial width of an outer peripheral edge of the teeth. In a tubular linear motor thus configured, a magnetic circuit cross-sectional area which is large in comparison with a conventional tubular linear motor can be secured, and magnetic saturation when the winding is electrified can be suppressed.

DESCRIPTION OF EMBODIMENTS

The present invention will be described hereinbelow on the basis of embodiments illustrated in the drawings. Note that the same reference signs are assigned to configurations common to tubular linear motors M1 and M2 according to the respective embodiments described hereinbelow, and that detailed descriptions of configurations described in the description of the tubular linear motor M1 according to one embodiment are omitted from the description of the tubular linear motor M2 according to the other embodiment.

First Embodiment

Figure 1:
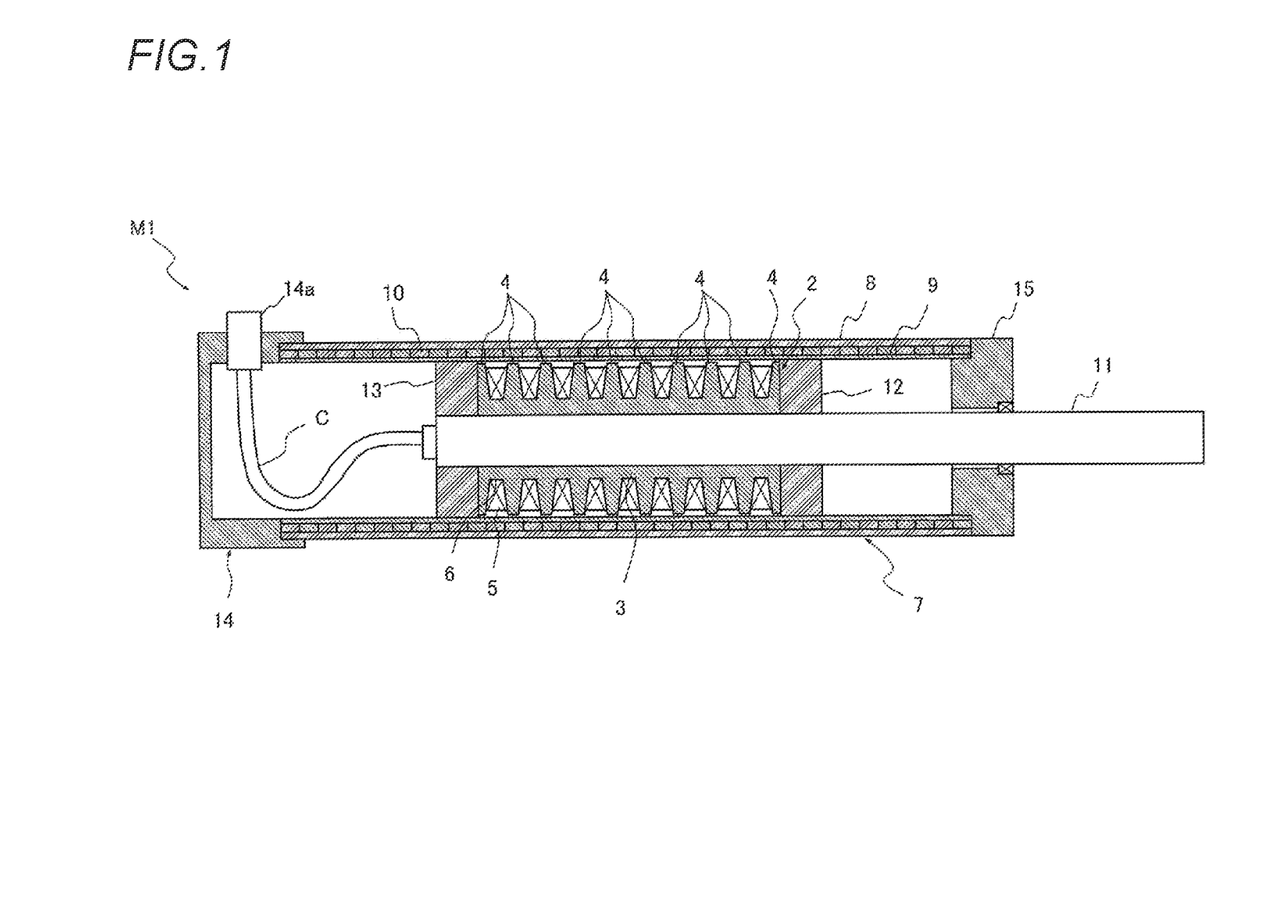
FIG. 1 is a vertical cross-sectional view of a tubular linear motor according to a first embodiment.

The tubular linear motor M1 according to the first embodiment includes, as illustrated in FIG. 1, a core 2 that has a tubular yoke 3 and a plurality of annular teeth 4 provided on an outer periphery of the yoke 3; a winding 5 mounted between the teeth 4, 4; and a field magnet 7 that is tubular and into which the core 2 is inserted movably in the axial direction.

Each part of the tubular linear motor M1 will be described in detail hereinbelow. The core 2 includes a cylindrical yoke 3, and a plurality of teeth 4 which are annular and provided at intervals in an axial direction on the outer periphery of the yoke 3, and constitutes a movable element in the present embodiment.

The yoke 3 is cylindrical as mentioned above and a wall thickness is secured such that, even when the teeth 4 are cut somewhere between the inner periphery and outer periphery thereof using a cylinder centered on an axis A of the core 2 (see FIG. 2), the cross-sectional area of the yoke 3 is equal to or larger than the area of the cross-section afforded when the teeth 4 are cut using the cylinder.

Figure 2:
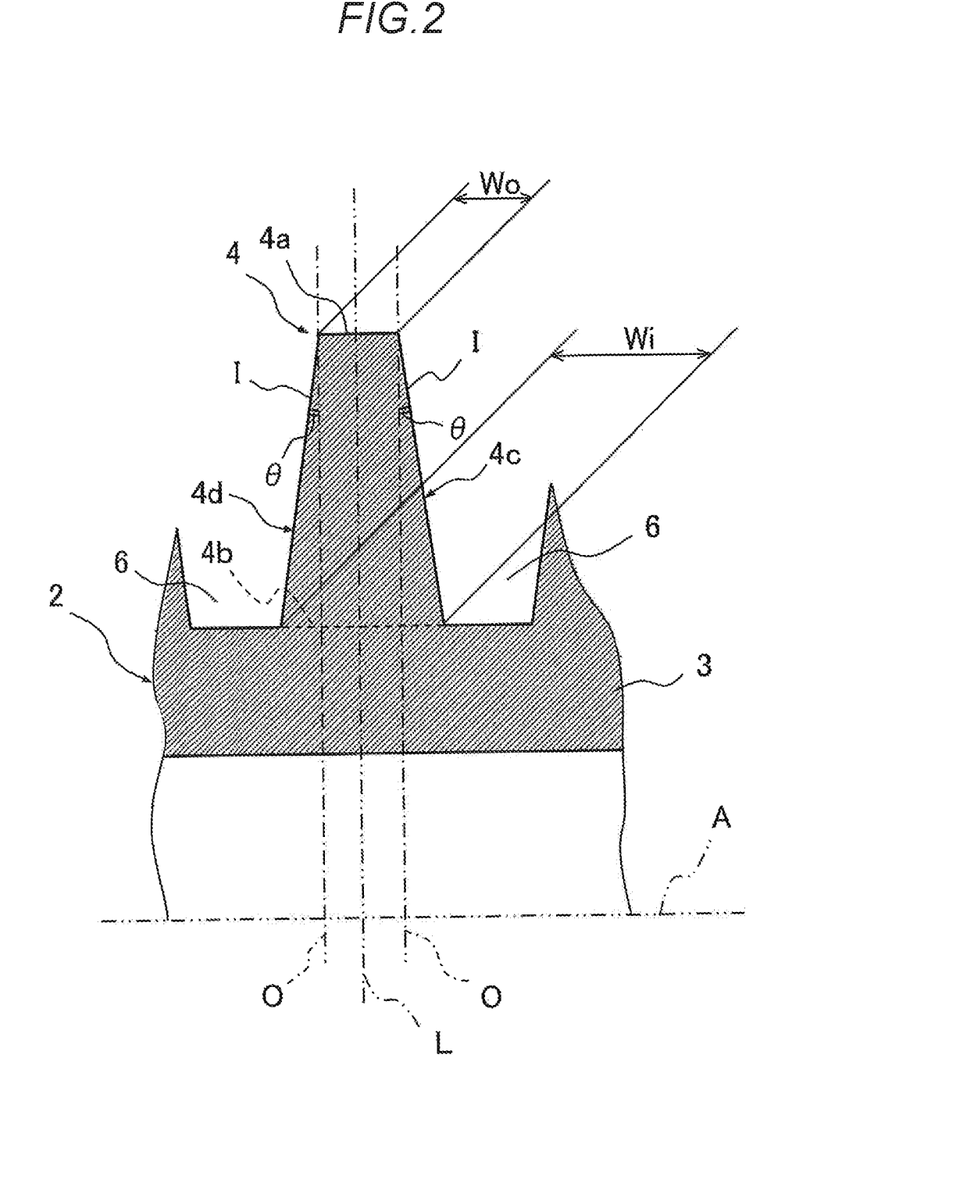
FIG. 2 is a vertical cross-sectional view of a tooth part of the tubular linear motor according to the first embodiment.

According to the present embodiment, as illustrated in FIGS. 1 and 2, ten teeth 4 are provided side-by-side at equal intervals in the axial direction on the outer periphery of the yoke 3, and a slot 6 constituting a gap into which the winding 5 is mounted is formed between the teeth 4, 4. In addition, the teeth 4 are each annular and have an inner peripheral edge 4b that has an axial width Wi larger than an axial width Wo of an outer peripheral edge 4a of the teeth 4. That is, the axial width Wi of the inner peripheral edge 4b of the teeth 4 is larger than the axial width Wo of the outer peripheral edge 4a of the teeth 4.

In addition, according to the present embodiment, as illustrated in FIG. 2, an inclined surface I connected to the outer peripheral edge 4a is provided on the sides 4c, 4d of the teeth 4 on both sides in the axial direction. Furthermore, at the cross section obtained by cutting the teeth 4 in a plane containing the axis A of the core 2, an interior angle θ formed between the inclined surface I and an orthogonal plane O orthogonal to the axis A of the core 2 is set at an angle in a range of six to twelve degrees.

In addition, according to the present embodiment, except for the teeth 4 arranged on the far left and far right in FIG. 1, the cross-sectional shape obtained by cutting the teeth 4 in a plane containing axis A of the core 2 is a shape with line symmetry for which a line L orthogonal to the axis A of the core 2 is the axis of symmetry, as illustrated in FIG. 2. In other words, a line that connects the center in the axial direction of the outer peripheral edge 4a of the teeth 4 to the center in the axial direction of the inner peripheral edge 4b of the teeth 4 geometrically coincides with the line L orthogonal to the axis A of the core 2, and the outer peripheral edge 4a, inner peripheral edge 4b, and sides 4c and 4d have a shape with line symmetry for which the line L is the axis of symmetry.

In addition, according to the present embodiment, a total of nine slots 6 constituting gaps are provided between the adjacent teeth 4, 4 in FIG. 1. Further, the winding 5 is mounted by being wound around the slots 6. As the winding 5, W-phase, W-phase, W-phase, and V-phase, V-phase, V-phase, V-phase, and U-phase, U-phase, U-phase, U-phase, and W-phase windings 5 are mounted.

Furthermore, the core 2 thus configured is mounted on the outer periphery of a rod 11 formed by a nonmagnetic body which is an output shaft. Specifically, the core 2 is fixed to the rod 11 as a result of the right and left ends of the core 2 in FIG. 1 being held by annular stoppers 12 and 13 which are fixed to the rod 11.

Meanwhile, a field magnet 7 includes, according to the present embodiment, an outer tube 8 formed from a cylindrical, nonmagnetic body, an inner tube 9 formed by a cylindrical, nonmagnetic body which is inserted inside the outer tube 8, and a plurality of permanent magnets 10 which are laminated in an axial direction and inserted throughout the annular gap between the outer tube 8 and inner tube 9. The core 2 is inserted movably in the axial direction inside the field magnet 7. The permanent magnets 10 are magnetized such that S poles and N poles are arranged alternately, in an axial direction, relative to the core 2 inserted on an inner peripheral side of the field magnet 7. Accordingly, in the field magnet 7, S poles and N poles are arranged alternately in an axial direction on the inner peripheral side thereof such that a magnetic field is made to act on the core 2. Note that, because the field magnet 7 only needs to cause a magnetic field to act on the range of movement of the core 2, the range over which the permanent magnets 10 are installed may be determined according to the range of movement of the core 2. Therefore, in the annular gap between the outer tube 8 and inner tube 9, the permanent magnets 10 need not be installed in areas where same are unable to oppose the core 2.

In addition, the left ends in FIG. 1 of the outer tube 8 and inner tube 9 are closed by a cap 14, and the right ends in FIG. 1 of the outer tube 8 and inner tube 9 are closed by an annular rod guide 15 that guides the movement, in the axial direction, of the rod 11 inserted inside the inner periphery. Furthermore, the stoppers 12 and 13 are in sliding contact with the inner periphery of the inner tube 9, and the core 2 is capable of moving smoothly, together with the rod 11, in an axial direction without axial misalignment relative to the field magnet 7. Further, the inner tube 9 forms a gap between the outer periphery of the core 2 and the outer periphery of the permanent magnets 10, and fulfills the role of guiding the axial movement of the core 2 in cooperation with the stoppers 12 and 13.

Note that the cap 14 is provided with a connector 14a that connects a cable C, which is connected to the winding 5, to an external power supply (not illustrated), thus enabling the winding 5 to be electrified by the external power supply. Furthermore, the axial length of the outer tube 8 and inner tube 9 is longer than the axial length of the core 2, and the core 2 is able to perform a stroke from left to right in FIG. 1 within the range of the axial length in the field magnet 7.

Furthermore, for example, if the electrical angle of the winding 5 relative to the field magnet 7 is sensed, electrification phase switching is executed on the basis of the electrical angle, and the amount of current in each winding 5 is controlled using PWM control, it is possible to control the thrust of the tubular linear motor M1 and the movement direction of the core 2. Note that the foregoing control method is an example and non-limiting. Thus, in the tubular linear motor M1 according to the present embodiment, the core 2 is an armature and a movable element, and the field magnet 7 behaves like a fixed element. Furthermore, in the event of an acting external force causing relative displacement of the core 2 and field magnet 7 in the axial direction, electrification of the winding 5 or an induced electromotive force generated in the winding 5 enables damping of device vibration or movement resulting from the external force on the tubular linear motor M1 by generating thrust to suppress the relative displacement, and also enables energy recovery in which electrical power is generated from the external force.

As described hereinabove, the tubular linear motor M1 of the present invention includes a core 2 that has a tubular yoke 3 and a plurality of teeth 4 which are annular and provided at intervals in an axial direction on an outer periphery of the yoke 3; a winding 5 mounted in a slot 6 between the teeth 4, 4; and a field magnet 7 that is tubular, into which the core 2 is movably inserted in the axial direction, and having N poles and S poles alternately arranged in the axial direction, wherein an axial width Wi of a yoke-side inner peripheral edge 4b of the teeth 4 is larger than an axial width Wo of an outer peripheral edge 4a of the teeth 4.

Figure 3:
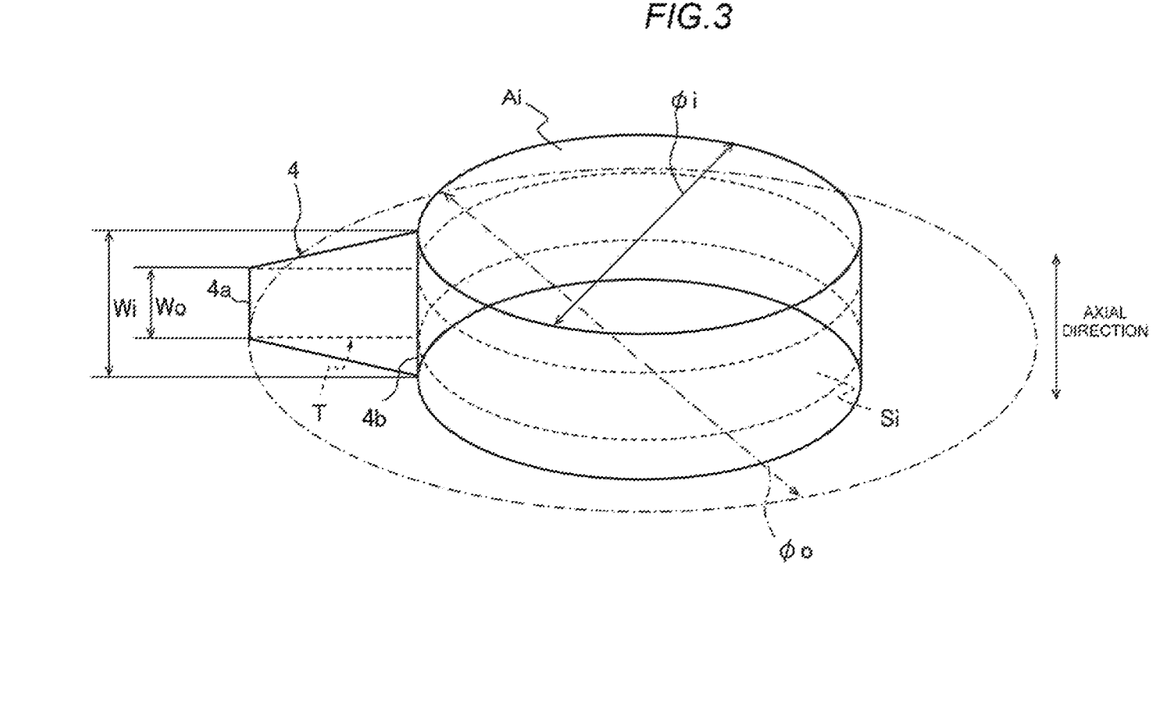
FIG. 3 is a diagram illustrating the difference between the area of the inner peripheral edge of the teeth of the tubular linear motor according to the first embodiment and the area of the inner peripheral edge of the teeth of a conventional tubular linear motor.

In the tubular linear motor M1 thus configured, the axial width Wi of the inner peripheral edge 4b of the teeth 4 is larger than the axial width Wo of the outer peripheral edge 4a of the teeth 4. Thus, as illustrated in FIG. 3, if the axial width of the outer peripheral edge is equal to that of conventional teeth T (Wo=to), in comparison with conventional teeth T for which the axial width is constant, an area (the part shaded with solid lines) Ai of the inner peripheral edge 4b of the teeth 4 is then larger than an area (the part shaded with broken lines) Si of the inner peripheral edge of the teeth T of a conventional tubular linear motor. In other words, in the tubular linear motor M1 of the present invention, a magnetic circuit cross-sectional area which is large in comparison with a conventional tubular linear motor can be secured and magnetic saturation when the winding 5 is electrified can be suppressed, and hence a large magnetic field can be generated, thereby improving the thrust. As detailed hereinabove, the tubular linear motor M1 of the present invention enables thrust to be improved by suppressing magnetic saturation.

Note that, in the foregoing example, the sides 4c and 4d of the cross section obtained by cutting the teeth 4 in a plane containing the axis A of the core 2 are shaped such that the edge of the outer peripheral edge 4a and the edge of the inner peripheral edge 4b are connected via a straight line. However, if the axial width Wi of the inner peripheral edge 4b of the teeth 4 is made larger than the axial width Wo of the outer peripheral edge 4a of the teeth 4, the thrust of the tubular linear motor M1 can be improved by suppressing magnetic saturation, and hence the shape of the sides 4c and 4d of the cross section obtained by cutting the teeth 4 in a plane containing the axis A of the core 2 is an arc shape or a parabola shape. The shape may also be such that the axial width of the teeth 4 becomes incrementally large at a midway point.

In addition, as mentioned earlier, if the area Ai of the inner peripheral edge 4b of the teeth 4 is made larger than the area Si of the inner peripheral edge of the teeth T of a conventional tubular linear motor, the magnetic circuit cross-sectional area can be more readily secured than for the conventional tubular linear motor. Because the axial width in the radial direction of the teeth T of a conventional tubular linear motor is constant, the area Si of the inner peripheral edge of the teeth T is equal to an area obtained by multiplying the axial width Wo of the outer peripheral edge 4a of the teeth 4 of the tubular linear motor M1 according to the present embodiment by the circumference $\pi \times \varphi i$ of the inner peripheral edge 4b of the teeth 4. In other words, if the area Ai of the inner peripheral edge 4b of the teeth 4 is larger than an area obtained by multiplying the axial width Wo of the outer peripheral edge 4a of the teeth 4 by the circumference $\pi \times \varphi i$ of the inner peripheral edge 4b of the teeth 4, the magnetic circuit cross-sectional area can be secured. Thus, the tubular linear motor M1 may include a core 2 that has a tubular yoke 3 and a plurality of teeth 4 which are annular and provided at intervals in an axial direction on an outer periphery of the yoke 3; a winding 5 mounted in a slot 6 between the teeth 4, 4; and a field magnet 7 that is tubular, into which the core 2 is movably inserted in the axial direction, and having N poles and S poles alternately arranged in the axial direction, wherein the area Ai of the inner peripheral edge 4b of the teeth 4 is larger than the area obtained by multiplying the axial width Wo of the outer peripheral edge 4a of the teeth 4 by the circumference $\pi \times \varphi i$ of the inner peripheral edge 4b of the teeth 4. Even when the tubular linear motor M1 is thus configured, because a larger magnetic circuit cross-sectional area than for a conventional tubular linear motor can be secured, magnetic saturation when the winding 5 is electrified can be suppressed, and a large magnetic field can be generated, thereby improving the thrust. Thus, the tubular linear motor M1 thus configured enables thrust to be improved by suppressing magnetic saturation. Note that, because the area Ai of the inner peripheral edge 4b of the teeth 4 only needs be larger than the area obtained by multiplying the axial width Wo of the outer peripheral edge 4a of the teeth 4 by the circumference $\pi \times \varphi i$ of the inner peripheral edge 4b of the teeth 4, the shape of the teeth 4 can also be changed arbitrarily.

Figure 4:
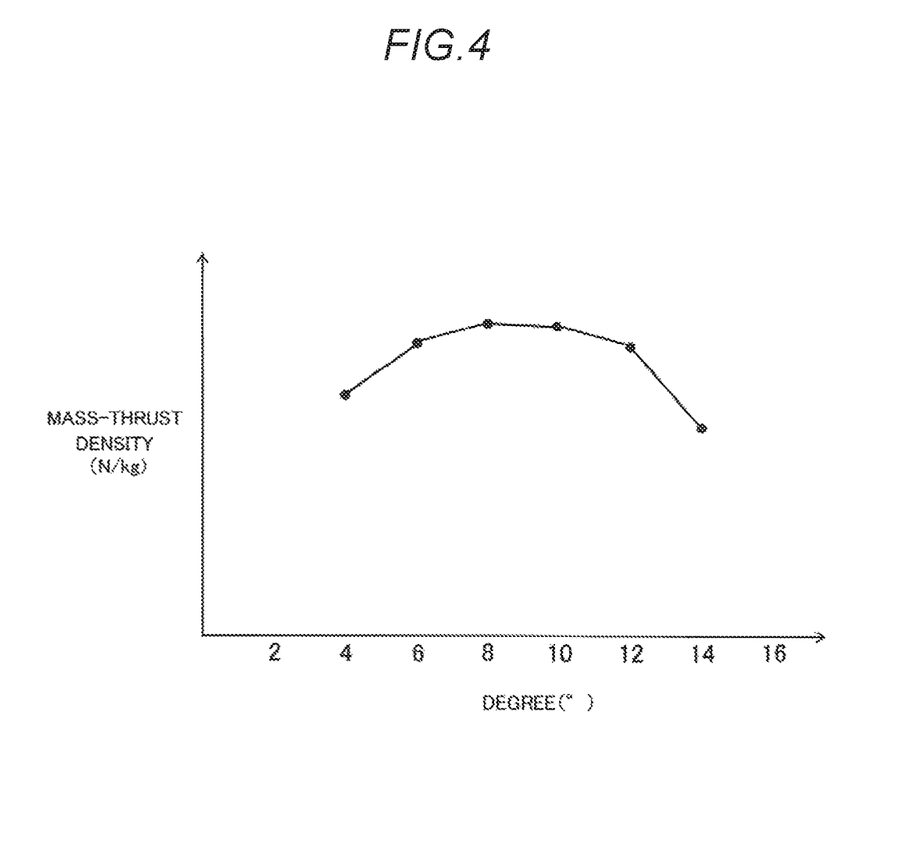
FIG. 4 is a diagram illustrating the relationship between the mass-thrust density of the tubular linear motor according to the first embodiment and the interior angle formed between the inclined surface of the teeth and the orthogonal plane orthogonal to the axis of the core.
Figure 5:
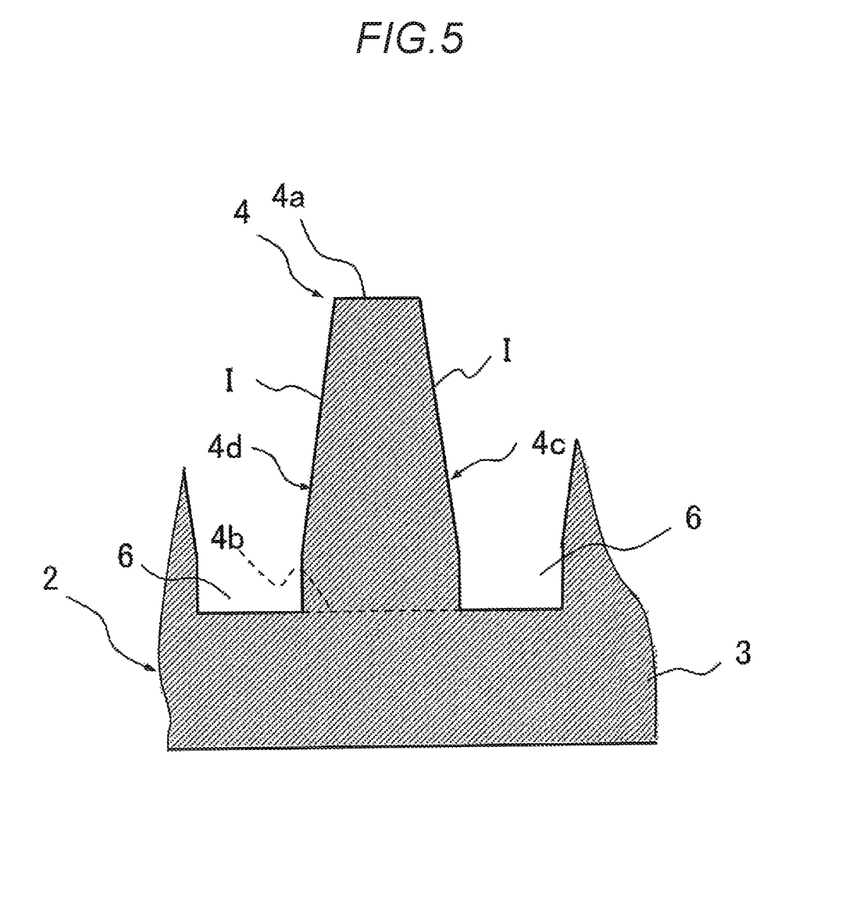
FIG. 5 is a vertical cross-sectional view of a tooth part of a tubular linear motor according to a modification example of the first embodiment.

Furthermore, in the tubular linear motor M1 according to the present embodiment, the sides 4c and 4d of the teeth 4 on both sides in the axial direction are provided with the inclined surface I, and an interior angle θ formed between the inclined surface I and the orthogonal plane O orthogonal to the axis A of the core 2 is an angle in a range of six to twelve degrees. If the structure of the tubular linear motor M1 is assumed, supposing that the outside diameter of the outer tube 8 of the tubular linear motor M1 according to the present embodiment is a diameter between 60 mm and 100 mm and the outside diameter of the core 2 is a diameter between 50 mm and 83 mm, the mass-thrust density when the interior angle θ formed between the inclined surface I of the sides 4c and 4d of the cross section of the teeth 4 and the orthogonal plane O is changed is as illustrated in FIG. 4. Here, the mass-thrust density is a numerical value obtained by dividing the maximum thrust of the tubular linear motor M1 with the foregoing configuration by the mass. Thus, if the interior angle θ formed between the inclined surface I of the sides 4c and 4d of the cross section of the teeth 4 and the orthogonal plane O is in a range of six to twelve degrees, it is clear that a favorable mass-thrust density is feasible. Based on the foregoing, when the interior angle θ formed between the inclined surface I provided for the sides 4c and 4d of the teeth 4 on both sides in the axial direction and the orthogonal plane O orthogonal to the axis A of the core 2 is an angle in a range of six to twelve degrees, the thrust per mass of the tubular linear motor M1 is large, and hence a tubular linear motor M1 which is compact and yields a large thrust can be realized. In other words, it is possible to realize a tubular linear motor M1 which is suitable for aircraft and vehicles in which there is no surplus installation space and which require a lightweight tubular linear motor. Note that, according to the present embodiment, although the inclined surface I occupies the whole of the sides 4c and 4d of the teeth 4 on both sides in the axial direction, even if the inclined surface I is not used for a portion of the sides 4c and 4d close to the inner peripheral edge 4b of the teeth 4 as illustrated in FIG. 5, the advantageous effects of affording the tubular linear motor M1 compactness and a large thrust are not lost. Windings 5 with different phases need to be wound around some of the slots 6, and an even number of these windings 5 must be wound in the same array around the slots 6. Hence, even when the sides 4c and 4d of the teeth 4 on both sides in the axial direction are provided with the inclined surface I, it may not be possible to provide the inclined surface I for the sides 4c and 4d at the deepest portion of the slots 6, that is, the base part of the teeth 4 connected to the core 2.

Furthermore, the area of the inner peripheral edge 4b of the teeth 4 may be made equal to or larger than the area of the outer peripheral edge 4a of the teeth 4. As illustrated in FIG. 3, suppose that the axial width of the inner peripheral edge 4b of the teeth 4 is Wo, the axial width of the outer peripheral edge 4a of the teeth 4 is Wi, the outside diameter of the teeth 4 is φo, and the inside diameter of the teeth 4 is φi. Thus, the area Ai of the inner peripheral edge 4b of the teeth 4 is then Ai=π×φi×Wi, and the area Ao of the outer peripheral edge 4a of the teeth 4 is then Ao=π×φo×Wo. Based on the foregoing, if the dimensions of the inside and outside diameters φi and φo and axial widths Wi and Wo of the inner peripheral edge 4b and outer peripheral edge 4a of the teeth 4 are configured so as to satisfy φo×Wo≤φi×Wi, the area of the inner peripheral edge 4b of the teeth 4 can be made equal to or larger than the area of the outer peripheral edge 4a of the teeth 4. In the tubular linear motor M1 thus configured, because it is possible to prevent the generation of magnetic saturation where the magnetic circuit cross-sectional area of the inner peripheral edge 4b of the teeth 4 becomes narrowest and results in a bottleneck, thrust can be improved more effectively.

In addition, if the cross-sectional area afforded when the teeth 4 are cut using a cylinder of any diameter centered on the axis A of the core 2 is made equal to or larger than the area Ao of the outer peripheral edge 4a of the teeth 4, it is possible to prevent the magnetic circuit cross-sectional area from resulting in a bottleneck at a midway point of the teeth 4. That is, if the cross-sectional area afforded when the teeth 4 are cut, in any position between the outer peripheral edge 4a and inner peripheral edge 4b of the teeth 4, using a cylinder of any diameter centered on the axis A of the core 2 is made equal to or larger than the area Ao of the outer peripheral edge 4a, it is possible to prevent the magnetic circuit cross-sectional area from becoming minimal at a midway point of the teeth 4. Thus, with the tubular linear motor M1 thus configured, because the magnetic circuit cross-sectional area does not become small at a midway point of the teeth 4, thrust can be improved more effectively.

Note that, focusing on the magnetic circuit cross-sectional area alone, as long as all the cross-sectional areas, obtained by cutting in any position between the outer peripheral edge 4a and inner peripheral edge 4b of the teeth 4 using a cylinder of any diameter centered on the axis A of the core 2, are made equal, the magnetic circuit cross-sectional area cannot result in a bottleneck and there is no wastage, thereby affording the core 2 a lightweight mass. Note that, if the cross-sectional area obtained by cutting the yoke 3 in the orthogonal plane O orthogonal to the axis A of the core 2 is also made equal to or larger than the area of the outer peripheral edge 4a of the teeth 4, a bottleneck in the magnetic circuit cross-sectional area is not generated by the yoke 3.

In addition, in the tubular linear motor M1 according to the present embodiment, the cross section obtained by cutting the teeth 4 other than the teeth 4 at the ends of the core 2 in a plane containing axis A of the core 2 has a shape with line symmetry for which line L, which is orthogonal to the axis A of the core 2 and passes through the center in the axial direction of the teeth 4, is the axis of symmetry. In the tubular linear motor M1 thus configured, because the teeth 4 have a symmetrical shape in the axial direction centered on the axial center thereof, though the core 2 may be made to exert a thrust in any lateral direction in FIG. 1 relative to the field magnet 7, the amount of current in the winding 5 is equal for an identical thrust. Thus, with the tubular linear motor M1 thus configured, there is no difference in polarity in the electrification amount of the winding 5 according to the driving direction of the tubular linear motor M1, and drive control is straightforward. However, in a case such as where the thrust generation direction of the tubular linear motor M1 is unidirectional, or the like, if the occurrence of a polarity difference, according to driving direction, in the electrification amount of the winding 5 does not matter, the shape of the teeth 4 need not be a symmetrical shape in the axial direction centered on the axial center thereof.

Note that, if the cross-section obtained by cutting the teeth 4 in a plane containing the axis A of the core 2 has a shape with line symmetry for which the line L orthogonal to the axis A of the core 2 is the axis of symmetry and the sides 4c and 4d of the teeth 4 on both sides in the axial direction are provided with the inclined surface I, suitably setting the axial width Wo of the outer peripheral edge 4a of the teeth 4, the interior angle θ formed between the inclined surface I and orthogonal plane O, and the outside diameter of the core 2 and the depth of the slot 6 enables the cross-sectional area afforded when the teeth 4 are cut using a cylinder of any diameter centered on the axis A of the core 2 to be made equal to or larger than the area Ao of the outer peripheral edge 4a of the teeth 4. In other words, if the sides 4c and 4d of the teeth 4 on both sides in the axial direction are provided with the inclined surface I, suitably setting the axial width Wo of the outer peripheral edge 4a of the teeth 4, the interior angle θ formed between the inclined surface I and orthogonal plane O, and the outside diameter of the core 2 and the depth of the slot 6 enables the core 2 to be formed by means of simple machining. When the core 2 is manufactured by means of cutting in particular, machining is straightforward.

Second Embodiment

Figure 6:
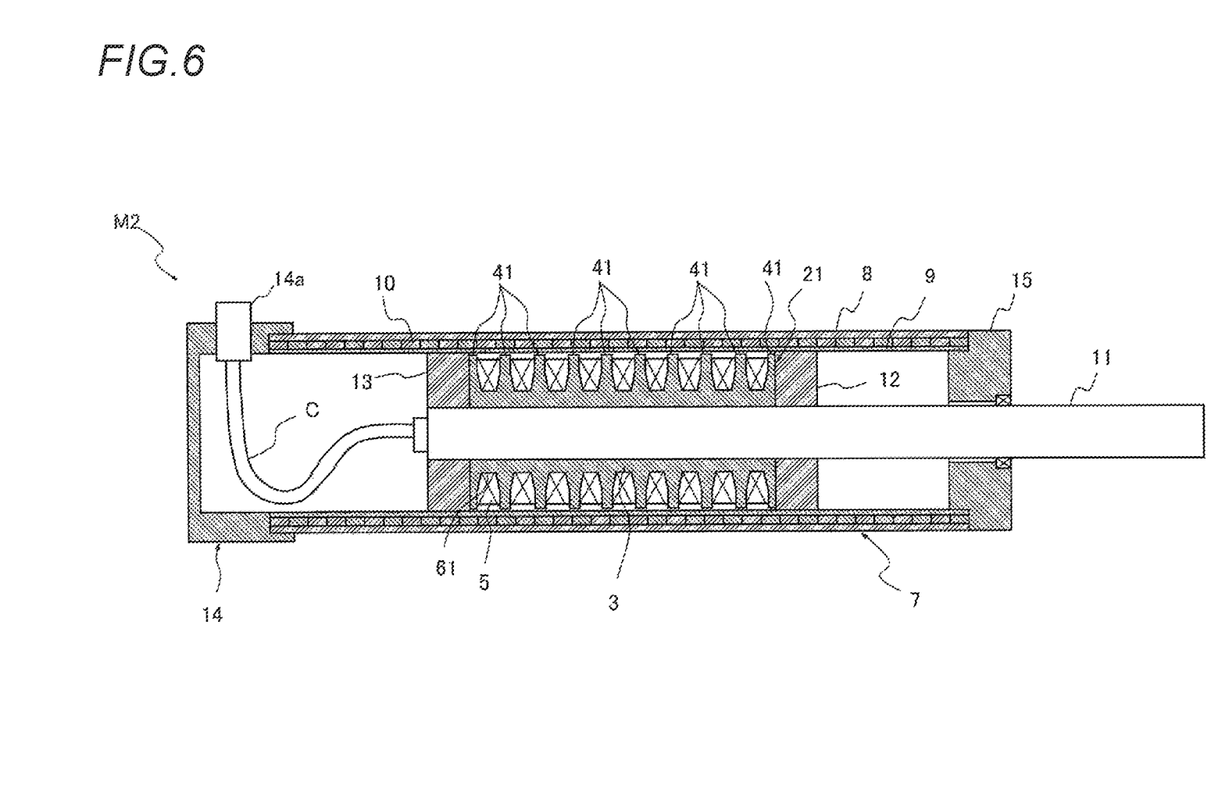
FIG. 6 is a vertical cross-sectional view of a tubular linear motor according to a second embodiment.

The tubular linear motor M2 according to the second embodiment includes, as illustrated in FIG. 6 and similarly to the tubular linear motor 1 according to the first embodiment, a core 21 that has a tubular yoke 3 and a plurality of annular teeth 41 provided on an outer periphery of the yoke 3; a winding 5 mounted between the teeth 41, 41; and a field magnet 7 that is tubular and into which the core 21 is inserted movably in the axial direction.

Figure 7:
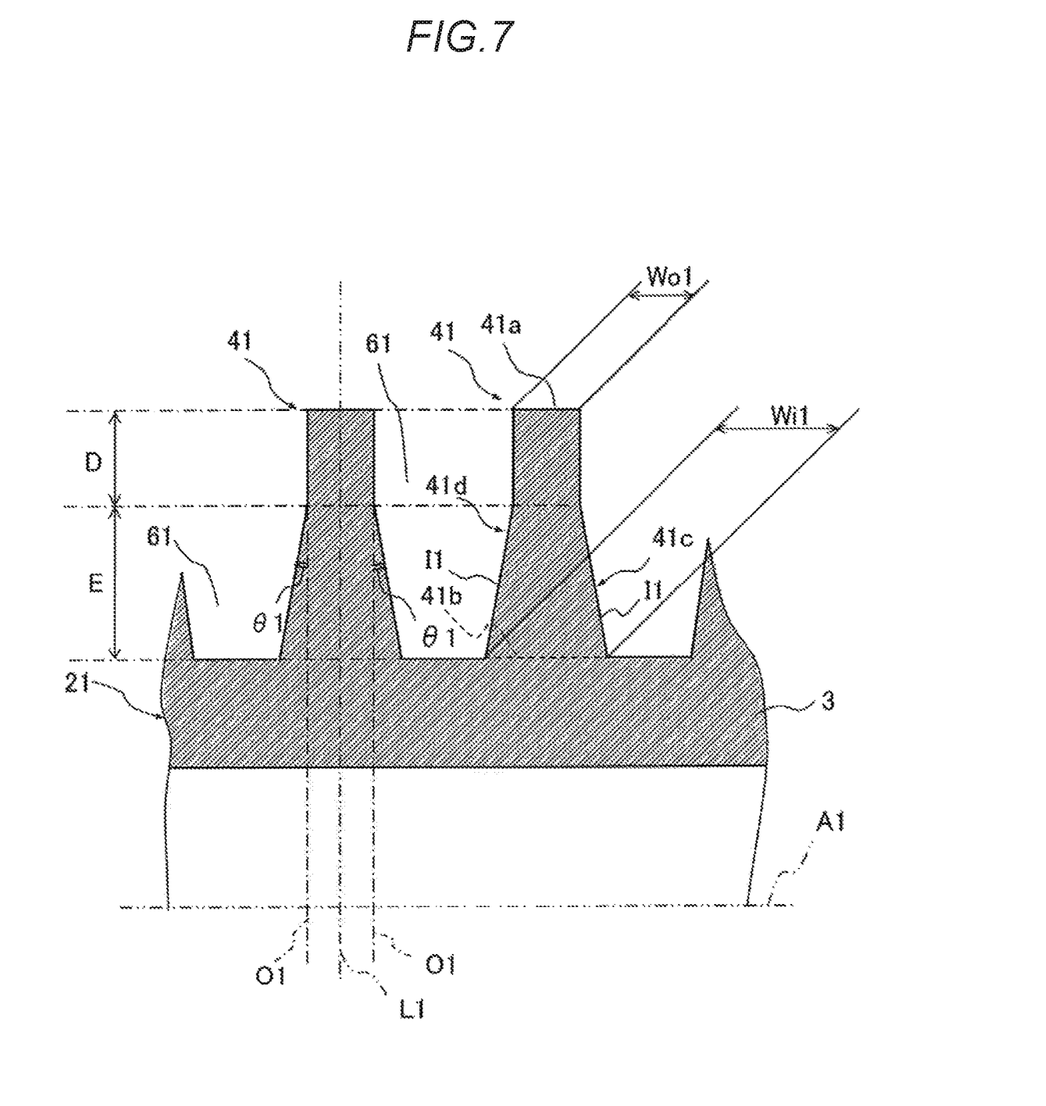
FIG. 7 is a vertical cross-sectional view of a tooth part of the tubular linear motor according to the second embodiment.

The tubular linear motor M2 according to the second embodiment differs from the tubular linear motor 1 according to the first embodiment in terms of the shape of the teeth 41 of the core 21. The teeth 41 will be described in detail hereinbelow. The teeth 41 of the tubular linear motor M2 according to the second embodiment are annular and have an inner peripheral edge 41b with an axial width Wi1 which is larger than an axial width Wo1 of the outer peripheral edge 41a, as illustrated in FIGS. 6 and 7. Furthermore, the teeth 41 are shaped such that the axial width of the teeth 41 in a range D extending from the outer peripheral edge 41a to a depth midway toward the inner peripheral edge 41b is constant, and the axial width in a range E extending from the midway depth to the inner peripheral edge 41b of the deepest portion increases toward the inner peripheral edge 41b.

In addition, according to the present embodiment, as illustrated in FIG. 7, the range D of sides 41c and 41d of the teeth 41 on both sides in the axial direction is a plane orthogonal to an axis A1 of the core 21, and the range E of the sides 41c and 41d of the teeth 41 on both sides in the axial direction is an inclined surface I1 that is inclined relative to the plane orthogonal to the axis of the core 21. Furthermore, at the cross section obtained by cutting the teeth 41 in a plane containing the axis A1 of the core 21, an interior angle θ1 formed between the inclined surface I1 and an orthogonal plane O1 that is orthogonal to the axis A1 of the core 21 is set at an angle in a range of six to twelve degrees. In addition, according to the present embodiment, the radial length of the teeth 41 in range D is shorter than the radial length of the teeth 41 in range E, and securing a large magnetic circuit cross-sectional area for the inner peripheral edge 41b of the teeth 41 may be considered.

Further, according to the present embodiment, except for the teeth 41 arranged on the far left and far right in FIG. 6, the cross-sectional shape obtained by cutting the teeth 41 in a plane containing axis A1 of the core 21 is a shape with line symmetry for which a line L1 orthogonal to the axis A1 of the core 21 is the axis of symmetry, as illustrated in FIG. 7. In other words, a line that connects the center in the axial direction of the outer peripheral edge 41a of the teeth 41 to the center in the axial direction of the inner peripheral edge 41b of the teeth 41 geometrically coincides with the line L1 orthogonal to the axis A1 of the core 21, and the outer peripheral edge 41a, inner peripheral edge 41b, and sides 41c and 41d have a shape with line symmetry for which the line L1 is the axis of symmetry.

In addition, like the tubular linear motor M1 according to the first embodiment, the tubular linear motor M2 according to the second embodiment has a total of nine slots 61 constituting gaps provided between the adjacent teeth 41, 41 in FIG. 6, and the winding 5 is mounted by being wound around the slots 61. Like the tubular linear motor M1 according to the first embodiment, the tubular linear motor M2 according to the second embodiment has W-phase, W-phase, W-phase, and V-phase, V-phase, V-phase, V-phase, and U-phase, U-phase, U-phase, U-phase, and W-phase windings 5, in order starting from the left side in FIG. 6, mounted in nine slots 61.

As described hereinabove, the tubular linear motor M2 of the present invention includes a core 21 that has a tubular yoke 3 and a plurality of teeth 41 which are annular and provided at intervals in an axial direction on an outer periphery of the yoke 3; a winding 5 mounted in a slot 61 between the teeth 41, 41; and a field magnet 7 that is tubular, into which the core 2 is movably inserted in the axial direction, and having N poles and S poles alternately arranged in the axial direction, wherein an axial width Wi1 of a yoke-side inner peripheral edge 41b of the teeth 4 is larger than an axial width Wo1 of an outer peripheral edge 41a of the teeth 41. Thus, like the tubular linear motor 1 according to the first embodiment, the tubular linear motor M2 according to the present embodiment enables a magnetic circuit cross-sectional area which is large in comparison with a conventional tubular linear motor to be secured and magnetic saturation when the winding 5 is electrified to be suppressed, and hence a large magnetic field can be generated, thereby improving the thrust. As detailed hereinabove, the tubular linear motor M2 of the present invention enables thrust to be improved by suppressing magnetic saturation.

In addition, the teeth 41 according to the present embodiment are shaped such that the axial width thereof in a range D extending from the outer peripheral edge 41a to a depth midway toward the inner peripheral edge 41b is constant, and the axial width in a range E extending from the midway depth to the inner peripheral edge 41b of the deepest portion increases toward the inner peripheral edge 41b. When the teeth 41 are thus configured, the interval between the teeth 41, 41 on the outer peripheral edge 41a side of the teeth 41 widens. In other words, the width of the slots 61 on the outer peripheral edge 41a side of the teeth 41 increases, and the number of electrical wires of the winding 5 between range D of the teeth 41 and range D of adjacent teeth 41 is large.

The winding 5 disposed in the part between the teeth 41, 41 on the outer peripheral edge 41a side lies opposite the field magnet 7 in the closest position to the field magnet 7, and the number of electrical wires of the winding 5 in this part has a significant effect on the thrust generated by the tubular linear motor M2, there being a tendency for the thrust to become large as the number of electrical wires of the winding 5 increases. Therefore, as per the present embodiment, supposing that the shape of the teeth 41 is a shape such that the axial width thereof in range D extending from the outer peripheral edge 41a to a depth midway toward the inner peripheral edge 41b is constant and that the axial width in range E extending from the midway depth to the inner peripheral edge 41b of the deepest portion increases toward the inner peripheral edge 41b, the number of electrical wires of the winding 5 arranged close to the field magnet 7 is increased while securing the magnetic circuit cross-sectional area. Thus, with the tubular linear motor M2 according to the present embodiment, because the number of electrical wires of the winding 5 arranged close to the field magnet 7 is increased while securing the magnetic circuit cross-sectional area, it is possible to improve the mass-thrust density of the tubular linear motor M2. Moreover, by adopting the foregoing shape, machining of the teeth 41 is also straightforward.

If the structure of the tubular linear motor M2 is assumed, supposing that the outside diameter of the outer tube 8 of the tubular linear motor M2 according to the present embodiment is a diameter between 60 mm and 100 mm and that the outside diameter of the core 21 is a diameter between 50 mm and 83 mm, setting an interior angle θ1 formed between the inclined surface I1 of the teeth 41 and the orthogonal plane O at about ten degrees makes it possible to achieve a balance between securing the magnetic circuit cross-sectional area of the teeth 41 and securing the number of electrical wires of the winding 5 arranged close to the field magnet 7, and is advantageous from the perspective of improving the mass-thrust density.

Note that, if the area of the inner peripheral edge 41b of the teeth 41 is larger than the area Si of the inner peripheral edge of the teeth T in a conventional tubular linear motor, the magnetic circuit cross-sectional area can be secured more readily than for a conventional tubular linear motor, and hence if the area of the inner peripheral edge 41b of the teeth 41 is made larger than the area obtained by multiplying the axial width Wo1 of the outer peripheral edge 41a of the teeth 41 by the circumference π×φi of the inner peripheral edge 41b of the teeth 41, the magnetic circuit cross-sectional area can be secured. Thus, the area of the inner peripheral edge 41b of the teeth 41 may be larger than the area obtained by multiplying the axial width Wo1 of the outer peripheral edge 41a of the teeth 41 by the circumference π×φi of the inner peripheral edge 41b of the teeth 41. Note that, because the area of the inner peripheral edge 41b of the teeth 41 only needs to be larger than the area obtained by multiplying the axial width Wo1 of the outer peripheral edge 41a of the teeth 41 by the circumference π×φi of the inner peripheral edge 41b of the teeth 41, as long as the shape of the teeth 41 satisfies the conditions of a shape where the axial width thereof in range D extending from the outer peripheral edge 41a to a depth midway toward the inner peripheral edge 41b is constant and the axial width in range E extending from the midway depth to the inner peripheral edge 41b of the deepest portion increases toward the inner peripheral edge 41b, the shape can be arbitrarily changed.

In addition, according to the present embodiment, the radial length of the teeth 41 in range D is shorter than the radial length of the teeth 41 in range E, and it is possible to secure a large magnetic circuit cross-sectional area for the inner peripheral edge 41b of the teeth 41 even when the axial width of the teeth 41 in range D is fixed. Thus, with the tubular linear motor M2 according to the present embodiment, because the number of electrical wires of the winding 5 arranged close to the field magnet 7 is increased while also securing a large magnetic circuit cross-sectional area, it is possible to further improve the mass-thrust density of the tubular linear motor M2.

Figure 8:
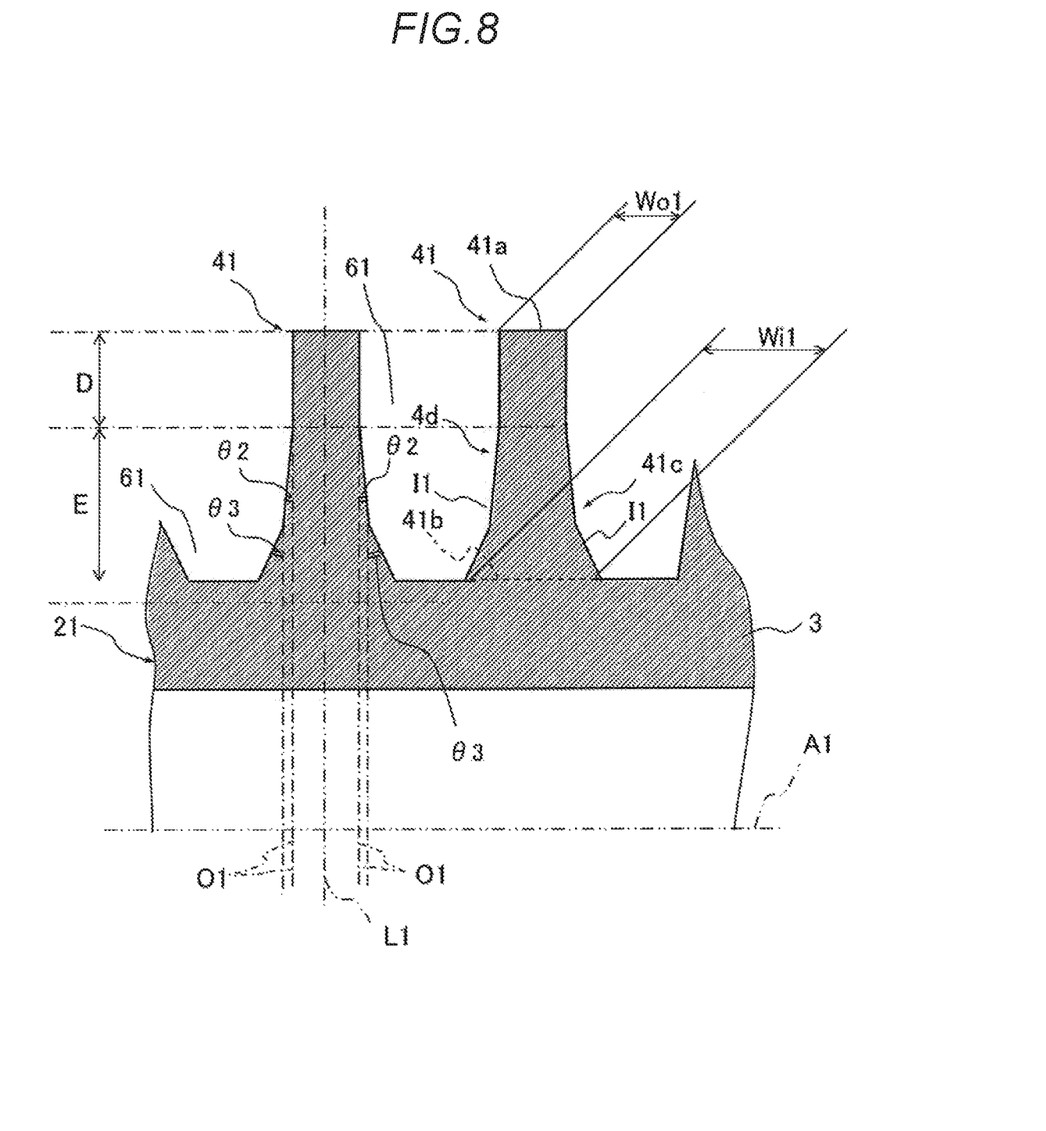
FIG. 8 is a vertical cross-sectional view of a tooth part of a tubular linear motor according to a modification example of the second embodiment.

Note that, as per the modification example illustrated in FIG. 8, the shape of the teeth 41 may be a shape such that range E to the inner peripheral edge 41b from the midway point of the sides 41c and 41d on both sides in the axial direction has the inclined surface I1 and such that interior angles θ2 and θ3 formed between the inclined surface I1 and the orthogonal plane O1 orthogonal to the axis A1 of the core 21 become incrementally large in moving from the midway point toward the inner peripheral edge 41b.

According to the present embodiment, the inclined surface I1 is shaped such that the angle of inclination changes at a midway point, and the interior angle θ3 on the inner peripheral side of the inclined surface I1 is larger than the interior angle θ2 on the outer peripheral side of the inclined surface I1.

Figure 9:
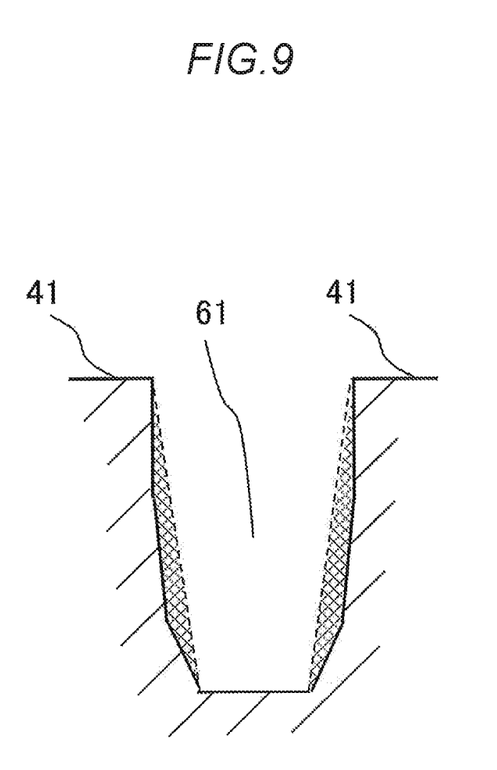
FIG. 9 is a diagram illustrating the capacity of a slot in the tubular linear motor according to a modification example of the second embodiment.

According to the present embodiment, the interior angle θ2 is set at ten degrees, and the interior angle θ3 is set at thirty degrees. Thus, when the shape is such that the interior angle formed between the inclined surface I1 and the orthogonal plane O1 becomes incrementally large in moving from the outer peripheral edge 41a side toward the inner peripheral edge 41b side, if the width of the deepest portion of the slot 61 is made the same, as illustrated in FIG. 9, the capacity of the slot 61 is then large because the cross-sectional area of the shaded parts in the drawing increases in comparison with the teeth 41 for which the angle of the inclined surface I1 illustrated by the broken lines in the drawing is constant, thereby increasing the number of electrical wires of the winding 5 per slot.

Therefore, like the teeth 41 in the modification example, if the shape of the teeth is a shape such that range E to the inner peripheral edge 41b from the midway point of the sides 41c and 41d on both sides in the axial direction has the inclined surface I1 and such that interior angles θ2 and θ3 formed between the inclined surface I1 and the orthogonal plane O1 orthogonal to the axis A1 of the core 21 become incrementally large in moving from the midway point toward the inner peripheral edge 41b, because the number of electrical wires of the winding 5 per slot 6 is increased while securing the magnetic circuit cross-sectional area of the teeth 41, it is possible to further improve the mass-thrust density of the tubular linear motor M2.

Note that, in the foregoing, the interior angle formed between the inclined surface I1 and the orthogonal plane O1 orthogonal to the axis A1 of the core 21 changes in two stages but may also change in three or more stages.

In addition, in the tubular linear motor M2 according to the second embodiment, the cross section obtained by cutting the teeth 41 other than the teeth 41 at the ends of the core 21 in a plane containing axis A1 of the core 21 has a shape with line symmetry for which line L1, which is orthogonal to the axis A1 of the core 21 and passes through the center in the axial direction of the teeth 41, is the axis of symmetry. In the tubular linear motor M2 thus configured, because the teeth 41 have a symmetrical shape in the axial direction centered on the axial center thereof, though the core 21 may be made to exert a thrust in any lateral direction relative to the field magnet 7, the amount of current in the winding 5 is equal for an identical thrust. Thus, with the tubular linear motor M2 thus configured, there is no difference in polarity in the electrification amount of the winding 5 according to the driving direction of the tubular linear motor M2, and drive control is straightforward. However, in a case such as where the thrust generation direction of the tubular linear motor M2 is unidirectional, or the like, if the occurrence of a polarity difference, according to driving direction, in the electrification amount of the winding 5 does not matter, the shape of the teeth 41 need not be a symmetrical shape in the axial direction centered on the axial center thereof.

Although preferred embodiments of the present invention have been described in detail hereinabove, alterations, modifications and changes are possible without departing from the scope of the claims.

The invention claimed is:

1. A tubular linear motor, comprising:
   a core that has a tubular yoke and a plurality of teeth which are annular and provided at intervals in an axial direction on an outer periphery of the yoke;
   a winding mounted in a slot between the teeth; and
   a field magnet that is tubular, into which the core is inserted movably in the axial direction, and having N poles and S poles alternately arranged in the axial direction,
   wherein an axial width of a yoke-side inner peripheral edge of the teeth is larger than an axial width of an outer peripheral edge of the teeth, and the teeth are shaped such that an axial width thereof is constant in a range extending from the outer peripheral edge to a midway point toward the inner peripheral edge, and the axial width, in a range extending to the inner peripheral edge from the midway point, becomes increasingly large toward the inner peripheral edge.

2. A tubular linear motor, comprising:
   a core that has a tubular yoke and a plurality of teeth which are annular and provided at intervals in an axial direction on an outer periphery of the yoke;
   a winding mounted in a slot between the teeth; and
   a field magnet that is tubular, into which the core is inserted movably in the axial direction, and having N poles and S poles alternately arranged in the axial direction,
   wherein an axial width of a yoke-side inner peripheral edge of the teeth is larger than an axial width of an outer peripheral edge of the teeth, the sides of the teeth on both sides in the axial direction have an inclined surface, and an interior angle formed between the inclined surface and an orthogonal plane orthogonal to an axis of the core is an angle in a range of six to twelve degrees.

3. The tubular linear motor as claimed in claim 1, wherein the teeth have an inclined surface in a range extending to the inner peripheral edge from the midway point of the sides of the teeth on both sides in the axial direction, and an angle formed between the inclined surface and an orthogonal plane orthogonal to an axis of the core becomes incrementally large in moving from the midway point toward the inner peripheral edge.

4. The tubular linear motor as claimed in claim 1, wherein a radial length in the range extending from the outer peripheral edge of the teeth to the midway point thereof is shorter than a radial length in a range extending from the inner peripheral edge of the teeth to the midway point thereof.

5. The tubular linear motor as claimed in claim 1, wherein a cross section obtained by cutting the teeth in a plane containing the axis of the core is a shape with line symmetry for which a line orthogonal to the axis of the core is the axis of symmetry.

\* \* \* \* \*